United States Patent [19]
LaGally et al.

[11] Patent Number: 5,789,720
[45] Date of Patent: *Aug. 4, 1998

[54] METHOD OF REPAIRING A DISCONTINUITY ON A TUBE BY WELDING

[75] Inventors: Hermann O. LaGally; Larry M. Kozak, both of Greensburg; Semur P. Sathi, Monroeville, all of Pa.

[73] Assignee: Westinghouse Electric Corporation, Pittsburgh, Pa.

[*] Notice: The term of this patent shall not extend beyond the expiration date of Pat. No. 5,359,172.

[21] Appl. No.: 524,667

[22] Filed: Sep. 8, 1995

Related U.S. Application Data

[63] Continuation-in-part of Ser. No. 278,351, Jul. 21, 1994, abandoned, which is a continuation-in-part of Ser. No. 998,218, Dec. 30, 1992, Pat. No. 5,359,172.

[51] Int. Cl.$^6$ .................................................. B23K 26/00
[52] U.S. Cl. .................................... 219/121.64; 376/260
[58] Field of Search ........................... 219/121.63, 121.64, 219/59.1, 60 R, 60.2, 137 R, 137 WM, 121.65, 121.66; 326/260

[56] References Cited

U.S. PATENT DOCUMENTS

| | | |
|---|---|---|
| 4,177,372 | 12/1979 | Kotera et al. . |
| 4,414,460 | 11/1983 | Sudo et al. . |
| 4,500,764 | 2/1985 | Girodi et al. . |
| 4,577,087 | 3/1986 | Chadwick . |
| 4,694,136 | 9/1987 | Kasner et al. . |
| 4,694,137 | 9/1987 | Hawkins et al. . |
| 4,730,093 | 3/1988 | Mehta et al. . |
| 4,737,612 | 4/1988 | Bruck et al. . |
| 4,743,733 | 5/1988 | Mehta et al. . |
| 4,839,495 | 6/1989 | Kitera et al. . |
| 4,978,834 | 12/1990 | Griffaton . |
| 5,006,268 | 4/1991 | Griffaton . |
| 5,408,883 | 4/1995 | Clark, Jr. et al. ................ 376/260 |

FOREIGN PATENT DOCUMENTS

| | | | |
|---|---|---|---|
| 0300458 A1 | 1/1989 | European Pat. Off. . | |
| 0600768 A1 | 8/1994 | European Pat. Off. . | |
| 269337 | 6/1989 | Germany | 219/76.1 |
| 3905684 | 8/1990 | Germany | 219/121.64 |
| 58-179587 | 10/1983 | Japan | 219/121.64 |
| 60-199587 | 10/1985 | Japan | 219/121.64 |
| 63-224890 | 9/1988 | Japan | 219/121.64 |
| 64-62290 | 3/1989 | Japan | 219/121.65 |
| 2-199397 | 8/1990 | Japan . | |
| 1701457 | 12/1991 | U.S.S.R. . | |
| WO91/14799 | 10/1991 | WIPO | 219/121.66 |
| WO 94/19141 | 1/1994 | WIPO . | |

*Primary Examiner*—Geoffrey S. Evans

[57] ABSTRACT

The wall of a pressure vessel tube having cracks or other discontinuities is repaired by localized melting with the addition of an alloying material. The melting reforms or eliminates the discontinuity while the alloying material improves the physical and chemical properties of the reformed tube wall. The alloying material may be added as an insert or as a weld wire. The insert may be melted in only its center section to ensure that the entire weld is properly alloyed. Sections of the insert which are not melted may be expanded to be in intimate contact with the tube. The weld wire feed means may be integral with the welding head. A post-weld stress relief process may be applied to the welded area to reduce residual stress generated by the welding operation.

20 Claims, 3 Drawing Sheets

METHOD OF REPAIRING A DISCONTINUITY ON A TUBE BY WELDING

CROSS-REFERENCE TO RELATED APPLICATIONS

This application is a continuation-in-part of Ser. No. 08/278,351, filed Jul. 21, 1994, now abandoned, which is a continuation-in-part of Ser. No. 07/998,218, filed Dec. 30, 1992, now U.S. Pat. No. 5,359,172 dated Oct. 25, 1994, and incorporated by reference herein.

BACKGROUND OF THE INVENTION

The invention relates to reforming degraded areas in ductile materials, in particular by melting a localized area to a predetermined depth, re-forming the localized area by cooling it, and advancing the localized melting and cooling through the degraded area to restore it to an integrally continuous form. The invention is particularly applicable to fusing service-induced stress and corrosion defects in coolant circuit tubes of pressurized water nuclear reactors.

PRIOR ART

The parent of this patent application, U.S. Pat. No. 5,359,172, describes a laser weld repair technique known as the "Direct Tube Repair" process or the "DTR" process; Direct Tube Repair and DTR being service marks of the Westinghouse Electric Corporation. The DTR process involves reforming portions of a heat exchanger tube wall by heating with laser energy. The DTR technique offers significant advantages over alternative plugging and sleeving repair methods.

Direct Tube Repair services can restore a component part to its original condition by fusing service-induced defects. However, in certain situations it is desirable to not only return a part to its original condition, but to upgrade that part so that it is less susceptible to such service-induced defects, thereby extending the operating life expectancy of the part.

Therefore, it is an object of this invention to provide a repair process which repairs service-induced defects in a component part and which reduces the susceptibility of that part to future service-induced defects. It is a further object of this invention to provide a repair process which extends the operating life expectancy of a component part. It is a further object of this invention to improve the corrosion resistance of a heat exchanger tube.

These and other aspects of this invention are met in a method for extending the operating life of a tube having a discontinuity extending at least part way through its wall thickness including the steps of melting a portion of the inside surface of the tube in the area of said discontinuity to create a weld pool which comes in contact with the discontinuity and reforms at least a portion of the discontinuity; adding an alloying material to the weld pool; and allowing the weld pool to cool and solidify.

The realization of these objects will be appreciated from the following discussion of particular exemplary embodiments of the invention. However it should also be appreciated that the invention is capable of variation from the examples, in accordance with the scope of the invention as claimed.

DETAILED DESCRIPTION OF THE PREFERRED EMBODIMENTS

Figure 1:
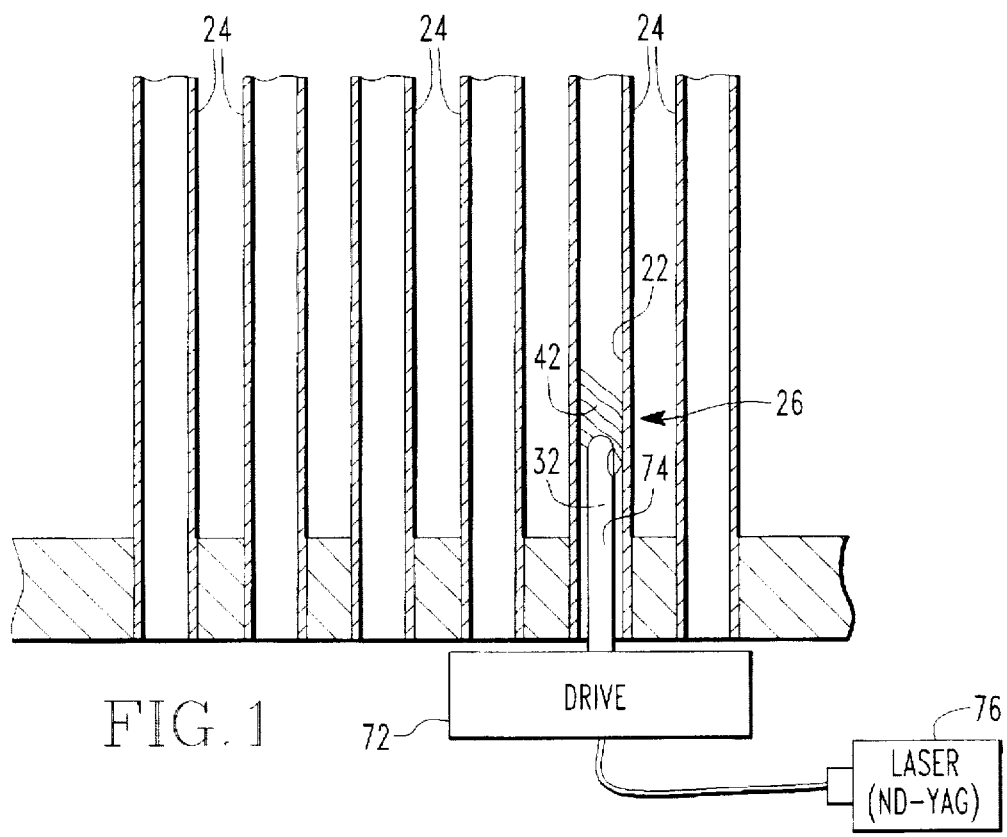
FIG. 1 is a partial section view showing application of the invention to the repair of heat exchanger tubes in a nuclear steam generator plant.

Referring to FIG. 1, for repairing a wall 22 of a pressure vessel tube 24 having a deteriorated zone, a welding head 32 is placed into the tube 24 at the deteriorated zone. The welding head is activated and moved progressively relative to the tube so as to melt a localized point along a line 42 on a surface of the wall. As the welding head is advanced, a welding line is formed, with the tube material behind the point of application of the weld head cooling and solidifying. The welding process melts and fuses the degraded area over a welding line having a width equal to the localized point of melting, and to a depth in the wall 22 defined by the dimensions over which the welding head applies energy, the amplitude of the energy applied and the time the energy is applied to a given location. The welding head is operated at a sufficient power level and is advanced at a sufficiently slow speed that the localized point is melted to a depth such that after solidifying the tube is restored to serviceable condition for its intended use. Solid material surrounds the localized area that is melted at any one time, and supports the melted material. After passage of the welding head, the surrounding solid material cools the material quickly by carrying away the thermal energy applied by the welding head.

Any defects which were present in the degraded zone of the tube become fused due to the melting of the tube material. The weld melts the material of the tube at least to a depth equal to a part of a thickness of the wall. It is possible to melt entirely through the depth of the tube wall, because the melted volume is conical or cup-shaped in cross section, with the width of the melted portion being greatest at the radial inside of the tube, and less proceeding away from the weld head. The melted material cools upon passage of the weld head, whereupon a repair has been effected without the necessity of adding to the wall thickness, plugging the tube or otherwise adversely affecting the flow and thermal characteristics of the tube.

Continuously during melting along a first line, or stepwise after the weld line has passed over a predetermined length, the welding head 32 is displaced laterally of the first line. Localized melting is continued along a line which is adjacent or overlapping the first line to melt and cool, thus to reconstitute the degraded area over a further width adjacent the first weld line. The weld head and weld pool are advanced linearly and laterally in this manner, successively melting linear sections of the wall and fusing the wall over the entire degraded area in a raster-like series of passes. The weld line is preferably advanced laterally by an amount less than the width of the weld line 42, such that the first weld line and the further weld line partly overlap, and a part of the first weld line is remelted in the process of forming the next.

The lateral advance can be stepwise or continuous and can involve any pattern of adjacent, preferably-overlapping passes which encompass the whole area of the repair. One alternative is to rotate the welding head relative to the axis of the tube to form the welding line and axially to advance the welding head relative to the tube to form the further width. When advancing the line of welding continuously, this motion produces a helical pattern of weld lines as shown in FIGS. 1 and 2.

Figure 3:
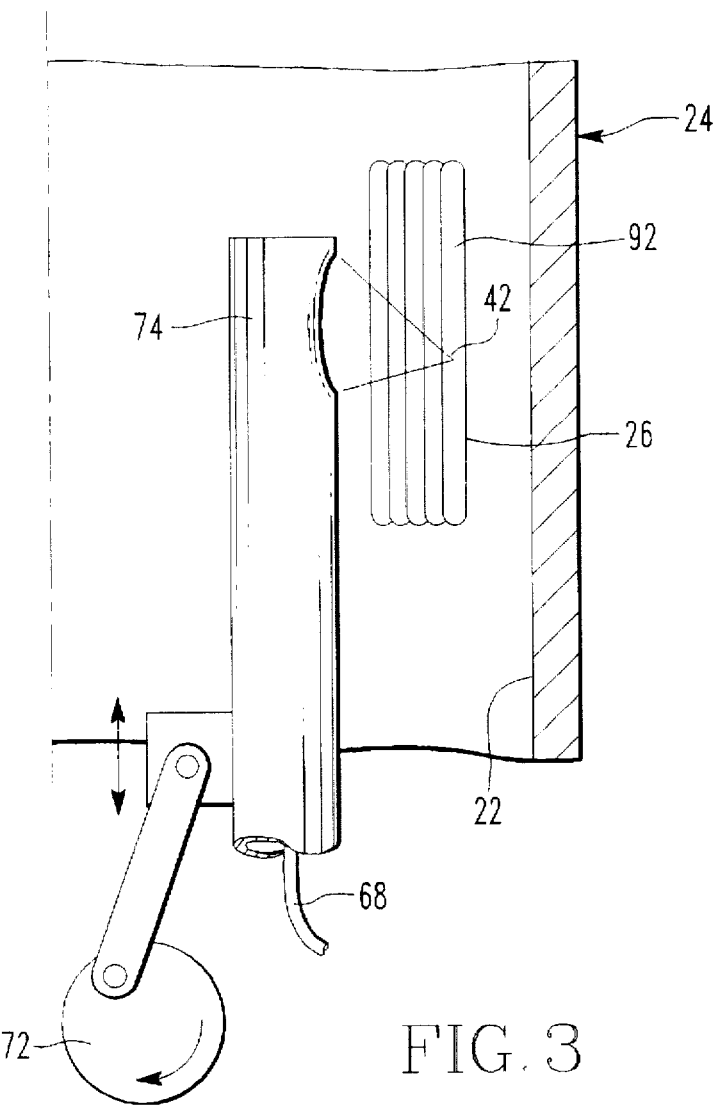
FIG. 3 is a schematic illustration of a method for relative displacement of the tube and welding means.
Figure 4:
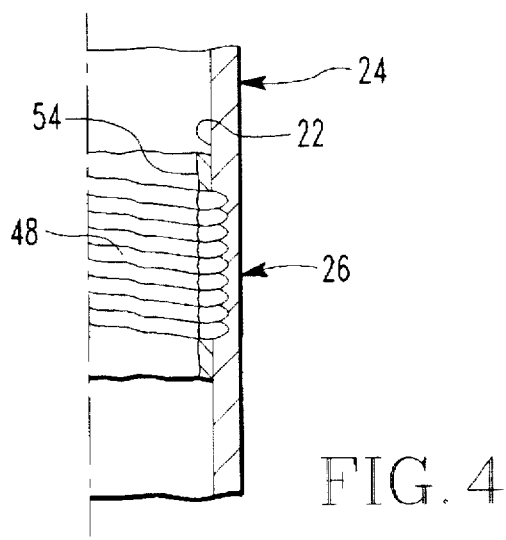
FIG. 4 is an elevation view, partly in section, showing application of an alloying agent in connection with the welding.

Another alternative is to relatively displace the point of application of energy via the welding head and the tube axially in an oscillating motion to form the welding line. The welding head is also relatively rotated with respect to the tube to form the further width. The pattern produced by this motion is represented by FIG. 3. The rotation can be stepwise, continuous or oscillating.

Preferably, the welding process uses laser welding, although other means for isolated local melting of a point on the tube are also possible. For laser welding the welding head comprises an optical system 62, directing laser emissions onto the degraded area 26. Mirrors 64, lenses 66 and fiber optic light conduits 68 can be employed. An example of an appropriate laser welding device for use according to the invention is disclosed in U.S. Pat. No. 4,694,136—Kasner et al, which is hereby fully incorporated.

Figure 2:
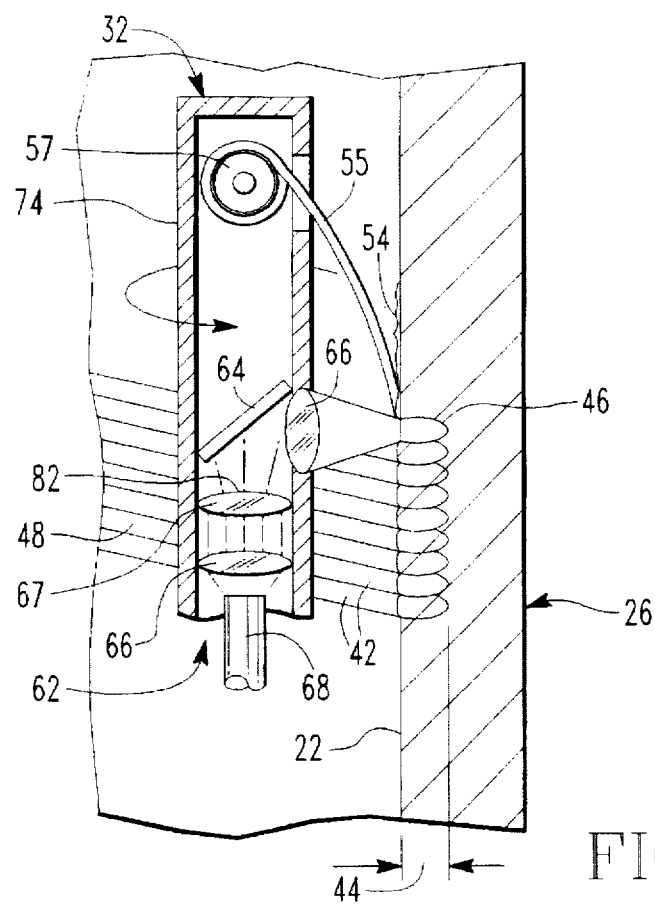
FIG. 2 is a schematic illustration of a welding means for directing laser emissions against the inner walls of a tube to be repaired by localized melting of the tube along a scanned progressive pattern.

Referring to FIGS. 1 and 2, a drive means 72 is operable to rotate and axially translate a stem 74 comprising the welding head 32. The fiber optic cable 68 couples the welding head to a high powered laser 76, for example a ND:YAG laser. The distal end 82 of the fiber optic cable is spaced from mirror 64. A first lens 66 collimates the light diverging from the end of the fiber optic cable and a second lens 67 focuses the light at the point of application to the tube wall. Lens 67 has a focal length substantially equal to the sum of the distances between lens 67 and the center of mirror 64, and between mirror and the point of welding. The light emitted from the fiber optic cable is thereby focused at a spot on the area 26 of tube 24 that is being repaired. The drive means 72 can rotate the stem relative to the fiber optic cable. Whereas the light is collimated between lenses 66 and 67, the axial position between end 82 and lens 66 is held constant, i.e., at the focal distance of the lens. The distance between lenses 66 and 67 can be varied, e.g., with axial displacement due to operation of the drive means 72. However, it is preferred in connection with axial displacement to move the welding head or stem axially as a unit to effect axial displacement.

FIGS. 1 and 2 illustrate an embodiment arranged to produce a helical pattern 48 of weld lines. In FIG. 3 an axial pattern is produced, using an axially oscillating drive means that moves the weld head up and down in the tube. A motor 96 can be provided for this purpose as shown. As in the previous embodiment, lenses focus the light emitted at the end 82 of the fiber optic cable 68.

The welding head is advanced axially and rotationally to cover the entire deteriorated area 26, in a series of passes. Parallel axial weld lines as shown in FIG. 3 can be made by rotationally indexing the weld head. Slanting or helical lines can be made by rotating the weld head continuously during scanning of the laser beam.

In order to guide each weld line so as to evenly overlap the previous weld line, it is possible to vary the rate of advance (and perhaps focusing) of the laser beam on the workpiece. Preferably, each weld line is tracked relative to the position of a previous weld line. This can be accomplished by providing a guide on the welding head, operable to rest against a ridge or other dimensional variation at the edge of the last weld line. Each weld line is placed adjacent the previous line, with a slight overlap, e.g., 50 to 80% of the width of the weld line. The specific power level of the laser can be varied as needed to accommodate a desired area over which the laser is to be focused, and a desired rate of advance. An average power of at least 200 watts can be used for welding, and an average power of 200–800 watts can be used advantageously.

The depth of the weld can be varied as a function of power level, focusing and rate of advance, in order to melt the tube material to the required depth. The temperature of melting of course varies with the material of the tube. For Inconel™ nickel-base Alloy 600 (ASME Alloy 600), as advantageously employed for steam generator heat exchanger tubes, the melting temperature is about 1,350° to 1,410° C. (or 2,470° to 2,575° F.). The typical thickness of the tube wall of a nuclear steam generator is about 0.050 to 0.055 inches (1.3 to 1.4 mm). Preferably the weld depth extends through 80 to 100% of the wall thickness. Of course it is possible to apply the invention to thicker or thinner tubes or to materials other than stainless steel, by correspondingly changing the power level, the rate of advance of the beam, etc. The dimensions, power levels and the like are exemplary only. The surface of the inner surface of the tube is rendered somewhat less smooth due to the welds, however the inside diameter of the tube is only minimally reduced. A shallow penetration surface repair by welding melts the tube through about 40% of its thickness. With the use of a narrow bead, the weld can extend through 100% of the tube thickness. This is possible because the bead tends to taper in cross section, having a typically conical shape. Although the melted material extends through the wall, the lateral dimensions of the bead at the outer wall surface are relatively small. Accordingly, the unmelted portion of the tube mechanically supports the melted bead. The area which is melted at any one time is relatively small and does not tend to flow, making it possible using this technique to weld quite deeply into the tube. Additionally, the heat energy applied at the welding point is quickly carried away and the melted portion cools promptly after the welding head passes.

An alloying material 54 can be diffused into the material of the tube during the welding process, and consumed. The alloying material can be applied as a powder 54 that is sprayed or painted onto the tube surface, either before or during welding, for example together with application of a welding cover gas. Alternatively, the alloying material may be in the form of a weld wire 55 which is fed continuously into the advancing weld pool as the welding head 62 is rotated so that the wire 55 and the tube 26 are melted together. Alloying wire 55 may be fed to the welding head 32 from a rotating platform placed outside of the tube, or alternatively, a limited supply of wire 55 may be stored integral or adjacent to the welding head 32 inside the tube. The inclusion of a wire feed means 57 integral or adjacent to the welding head 32 simplifies the mechanism required to deliver weld wire 55 to the rotating welding head 32. The alloying material may also be applied as a sleeve shaped insert that is consumed in the process and fused with the melted and reformed material of the tube. The sleeve may have a simple cylindrical shape, or it may have other shapes such as a rosette, or a coil wound from round or rectangular wire, or it may have a slotted design.

Figure 5:
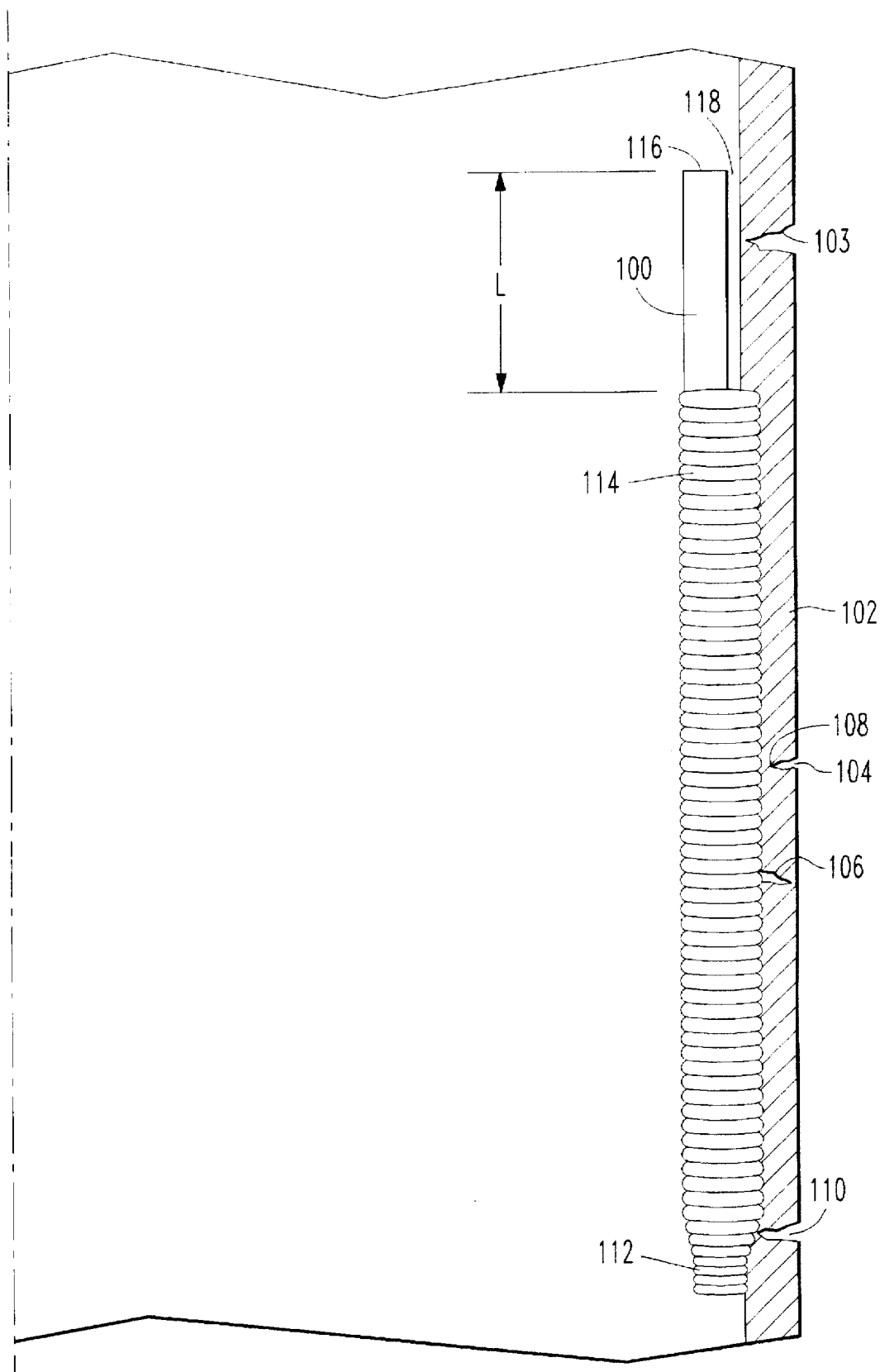
FIG. 5 is an elevation view, partly in section, showing application of an alloying agent in the form of a tube insert.

FIG. 5 illustrates the use of an alloying material in the shape of an insert or tube liner 100. The insert 100 may be positioned within the tube 102 in a portion of the tube 102 which has one or more discontinuities, such as OD cracks 103, 104, and 110 or ID crack 106. Such discontinuities often have a morphology which includes a stress riser at the tip, for example the crack tip at 108. When a weld pool is formed which includes the insert 100 and tube wall near such a discontinuity, a portion of the weld pool may come in contact with the discontinuity, as illustrated by crack 110. In this manner, the resulting tube condition is improved in two ways. First, the morphology of the crack tip is reformed by the weld pool and its effect as a stress riser is reduced or eliminated. Second, the cooled and solidified weld pool material is now an alloyed weld material 112 consisting of a combination of the base tube wall material 102 and the insert material 100. By properly selecting the insert material 100, the resulting alloyed material 112 may have improved corrosion resistance or other desired physical properties. For example, if the tube 102 is fabricated of an alloy such as Alloy 600, the insert 100 may be selected to contain additional chromium, for example nickel-base Alloy 672, so that the alloyed material 112 represents alloy 690. Other materials such as nickel-base Alloy 690 or an alloy which meets the requirements of American Welding Society (AWS) Class ERNiCr-3 may be used as insert material. An analysis of the growth rate of the discontinuity 110 before and after such an alloying process will demonstrate a reduced growth rate and an extended operating life for the tube, since the stresses at the tip of the discontinuity have been reduced, the material properties through which the discontinuity must progress have been improved, and the depth of the discontinuity has been reduced.

When using an insert 100 to provide alloying material for the Direct Tube Repair process, it is optional whether or not to melt the entire insert. It may be desirable to begin and to terminate the melting process in a center section of the insert and away from the ends of the insert. In this manner it can be assured that the entire weld consists of alloyed material. For example, weld material 112 is located at an end of insert 100, and it is possible that the final pass of the weld may have extended beyond the end of the insert 100 so that alloyed weld material 112 may contain less of the insert material near its end. Conversely, weld material 114 is located in a center section of the insert away from end 116 of the insert 100. This ensures that alloyed material 114 will contain the desired amount of alloying material throughout its entire length. This may be important for preventing cracks from forming in the alloyed material 114, and it ensures that the desired improvement in material properties is achieved and that the desired wall thickness is maintained. The unwelded length of insert 100 may also be selected to provide sufficient lead-in and lead-out to prevent masking of nondestructive examination signals of the weld by the discontinuity of the insert end 116.

It may be desirable to expand the insert 100 to be in essentially full or intimate contact with the tube 102 before or after the welding process. Expansion offers several advantages. First, it ensures that the insert will remain in the desired position within the tube 102. Second, it can minimize the possible crevice 118 remaining between the welded area 114 and the end 116 of the insert, thereby reducing or eliminating a site for the collection of contaminants. Third, if the insert 100 is left with any appreciable unwelded length L, it may be desirable to expand the insert 100 to provide improved heat transfer between the tube 102 and the insert 100. Finally, should a flaw 103 exist in the tube 102 adjacent to unwelded portion L, the burst strength of the tube will be appreciably increased when the insert 100 is fully expanded over the flaw 103.

Insert 100 can be made to extend up to the full length of the tube 102. The insert 100 may be dead annealed prior to being inserted into the tube in order to maximize its flexibility for being inserted through bends in the tube 102 and to improve its capability to be expanded without cracking. In such applications the weld may be made at or near the two ends of the tube 102 or beyond any predetermined length of the tube 102, with the insert 100 being expanded into intimate contact with the tube 102 in the unwelded areas. A post weld stress relief process may be applied to the welded area to reduce the residual stress in the weld. Energy for this process may be provided by operating the welding laser at a reduced power level or by providing an alternative heat source. By selecting an insert which is thin and ductile enough, it is possible to expand the insert 100 simply by subjecting it to the normal operating pressure of the tube, such as when the tube is returned to service following completion of the DTR services. Such a thin walled tube liner will provide a significant improvement in the burst strength of the tube.

An application for which an insert may be desirable is for the repair of cracking in a tube adjacent a tube support plate. For example, in the steam generators of a pressurized water nuclear power plant having ⅞ inch diameter Alloy 600 tubing with a nominal wall thickness of 50 mils, an Alloy 672 insert two inches in length may be selected to provide for a one inch weld length which encompasses the area adjacent to the three quarter inch thick tube support plate, and to provide at least a half inch unwelded length above and below the weld. For this application a 0.020 inch thick insert may be selected to provide sufficient alloying material to minimize the possibility of weld cracking, and to provide sufficient material to accommodate the expansion of the insert into contact with the tube. The unexpanded outside diameter of the insert may be selected to be 0.640 inches, and the expanded outside diameter of the insert is nominally the 0.775 inch inside diameter of the tube. The insert may be annealed prior to insertion to prevent tearing during the expansion process. Welding parameters for such steam generator applications must be chosen to balance the variables of depth of penetration, surface quality, laser operating limits, and the possibility of cracking. Acceptable parameters include a 40 Hertz frequency, 430 watts at the weld, and a 20 msec pulse rate.

In order to obtain good control of the depth of penetration of the weld repair, it has been found that a relatively slow laser pulse frequency should be maintained, with a relatively long pulse duration for welds which do not utilize an insert. For the typical Inconel nickel base Alloy 600 nuclear plant steam generator tubing described above, a pulse frequency of less than about 20 Hz and a pulse duration of above about 0.005 seconds are preferable, using a laser at about 300–325 watts of average power. Acceptable welds having 80–100% wall thickness penetration have been obtained using a pulsed YAG laser set for a pulse frequency of 14 Hz and a pulse duration of 0.0076 seconds at these power levels. These parameters provide a pulse shape with a high peak power during the initial portion of the energy pulse, and a lower energy level during the remainder of the pulse. For a given average power output, a relatively low frequency will result in a deeper penetration into the tube wall because of the effect of the power peak. As a result of the high peak power and low pulse frequency, the dominant cooling mechanism for the weld pool is radiation, and a portion of the weld pool returns to the solid condition between the energy pulses. Because conduction cooling is less dominant than radiation cooling under these conditions, the weld repair is less sensitive to heat sink conditions outside of the tube wall, such as the presence or absence of a tube support plate, tube sheet or moisture. It has been found that these parameters can provide crack-free weld repairs for Inconel nickel-base alloy tubing which has sulfur levels in the usual range of 0.002–0.003 percent by weight. However, when the sulfur levels increase to about 0.004 percent, the resulting weld repairs remain subject to cracking.

For Inconel nickel-base alloy tubing having sulfur content above about 0.004 percent, it is desirable to utilize laser energy parameters which result in conduction being the predominant cooling mechanism and which will maintain the weld pool as a liquid between energy pulses, in order to maximize the dispersion of the contaminants in the weld pool. For repairs of Inconel 600 nuclear steam generator tubing using the laser system described above with no alloying insert, pulse frequencies of up to about 100 Hz and pulse durations of no more than about 0.001 seconds have been found to reduce the cracking potential of weld repairs in such material. In order to obtain the desired 80–100% penetration of the tube wall with these parameters, the average power output of the laser must be higher due to the relatively lower power peak. A disadvantage of such parameters is that the repaired surface tends to be rippled, probably due to instabilities in the weld pool resulting from the higher power level, and this makes it difficult to perform nondestructive testing on the repaired tube wall areas. Furthermore, at these parameters the weld is more sensitive to heat sink variations outside of the tube wall because of the increased influence of conduction cooling.

It is known in the art to apply an inert cover gas over a weld pool to isolate the weld from external contaminants and oxygen. However, it has been found that reduced sensitivity to impurities in steam generator tube wall material may be obtained by utilizing a reactive cover gas which acts to scavenge the impurities from the weld pool. Carbon dioxide, a mixture of carbon dioxide and air, and a mixture of carbon dioxide and oxygen have all been used successfully. Anhydrous ammonia or a mixture of argon and hydrogen would provide a similar benefit.

A reactive cover gas may be supplied to the weld area via the inside diameter of the weld head stem 74, as illustrated in FIG. 3. The cover gas can be made to pass over the mirrors 64, lenses 66 or other optical components in order to protect them from weld splatter and in order to provide cooling. Carbon dioxide supplied in this manner will provide adiabatic cooling as it expands within the weld head, thereby providing cooling to the optical components. Since the oxygen in the carbon dioxide is in combined form, it does not oxidize the optical components. As the carbon dioxide enters the weld zone the heat of the welding process breaks down the carbon dioxide, thereby releasing free oxygen which mixes with the molten metal. The free oxygen combines with the tramp elements, such as sulfur, and as a result it eliminates cracking of the weld metal upon cooling. This process may be augmented through the addition of controlled amounts of free oxygen in addition to the carbon dioxide. A second cover gas may be supplied to the weld area via the inside diameter of the tube under repair. In this manner, it is possible to provide a combination of two types of cover gases; a first cover gas being selected primarily for its cooling properties and a second cover gas being selected primarily for its ability to scavenge impurities from the weld pool. For example, carbon dioxide may be provided over the optical components via the weld head stem, and air or oxygen may be provided along the inside of the tube.

In spite of the beneficial effect of the special cover gasses, for some tube materials it may not be possible without using an insert to obtain crack-free laser weld repairs having an inspectable surface condition, while at the same time using process conditions which provide good control of the depth of weld penetration. In such situations, a two-step weld repair technique may be used. It has been found that cracks occurring in tube wall repair welds as a result of impurities such as sulfur in the weld pool are most often found in the upper portion of the weld, i.e. the surface closest to the heat input surface. Cracks in nuclear steam generator tubing resulting from sulfur levels in excess of 0.003 percent are typically found in the top one-third of the weld. By using a two step process, good control of the depth of the weld penetration can be maintained in the first step, then the top portion of the repair area can be remelted to eliminate any cracks resulting from the first step. For example, the laser energy parameters for the first step may be selected to have a relatively low pulse frequency and a relatively long pulse duration, thereby providing good control of the depth of penetration. In this manner a first repair having a weld depth of 80 to 100% of the wall thickness can be obtained with relatively low sensitivity to external heat sink conditions. For Inconel nickel-base Alloy 600 nuclear steam generator tubing, a 14 Hz pulse rate and 0.0076 second pulse duration may be selected at an average power level of approximately 300–325 watts. If cracking occurs in the weld repair area as a result of the tubing having more than about 0.004 percent by weight of sulfur or other similarly acting contaminants, such cracking will be predominantly in the top portion of the weld. Such cracking can be subsequently repaired using a second heat cycle having laser energy parameters selected to be relatively high in frequency and relatively short in pulse duration, for example 100 hertz and 0.001 second respectively. With these parameters an average power level of about 300 watts will provide melting to a depth of only about a third of the tube wall thickness, since the peak power is reduced as a result of the increased frequency. This second step will provide a crack-free weld, and in the process, will repair any cracks resulting from the first melt. Another consequence of using only enough average power to obtain melting of about one third of the tube wall thickness is that the surface finish of the weld will be sufficiently smooth to perform routine nondestructive examinations, since the instabilities of the weld pool are minimized due to the shallow depth of the pool. This two step process can be implemented with a variety of cover gasses, such as those discussed above, to further minimize the cracking resulting from contaminants in the weld pool.

As discussed above and claimed below, the nickel base alloys designated as Alloy 600, Alloy 690 and American Welding Society Class (AWS) ERNiCr-3 are intended to identify alloys having the compositions (by weight percent) listed by Metals Handbook, 10th Edition, Volume 2, at Table 4 (Alloys 600 & 690) and Table 8 (ERNiCr-3) and the nickel base alloy designated as Alloy 672 is intended to identify an alloy having the nominal composition (by weight percent) which is available from Huntington Alloys of Huntington, W. Va.; these compositions being:

| Element | 600 | 672 | 690 | ERNiCr-3 |
|---|---|---|---|---|
| NI | 72 min | 55 | 58.0 min | 67.0 min |
| Cr | 14.0–17.0 | 44 | 27.0–31.0 | 18.0–22.0 |
| Fe | 6.0–10.0 | 0.2 | 7.0–11.0 | 3.0 max |
| C | 0.15 max | 0.04 | 0.05 max | 0.10 max |
| Mn | 1.0 max | 0.1 | 0.50 max | 2.5–3.5 |
| Si | 0.5 max | 0.1 | 0.50 max | 0.50 max |
| Cu | 0.5 max | 0.1 | 0.50 max | 0.50 max |
| Ti | — | 0.7 | — | 0.75 max |
| Cb + Ta | — | — | — | 2.0–3.0 |
| S | — | 0.008 | — | 0.015 max |
| P | — | — | — | 0.03 max |

The invention is particularly applicable to correcting degradation of the heat transfer tubes of a nuclear steam generator plant. Typically, a plurality of individual tubes 24 are arranged parallel to one another and extending between inlet and outlet manifolds, one wall 25 of a manifold being shown in FIG. 1. Access to the tubes can be obtained from inside the manifolds, for example controlling the weld head by remote control and thus avoiding human exposure to the environment of the reactor systems. This invention may also be applied to any other type of tubular product, for example a pipe or a reactor vessel head penetration; and further, it may be applied to any part having a wall, for example a valve body, a tank wall, etc.

The invention having been disclosed, a number of variations and alternatives will now be apparent to persons skilled in the art. The invention is not limited to the examples disclosed above and includes a reasonable extent of variation in accordance with the appended claims, to which reference should be made in assessing the scope of the invention in which exclusive rights are claimed.

We claim:

1. A method for expanding the operating life of a tube having a discontinuity extending at least part way through its wall thickness comprising the steps of:

melting at least about 40% of the wall thickness of a portion of said tube while in a vessel in the area of said discontinuity to create a weld pool which comes in contact with said discontinuity and which reforms at least a portion of said discontinuity;

adding an alloying material to said weld pool; and allowing said weld pool to cool and solidify.

2. The method of claim 1, further comprising the step of performing a post-weld stress relief on said portion of said tube.

3. The method of claim 1, further comprising the step of:

positioning an insert of said alloying material adjacent said inside surface of said tube prior to the step of melting; and wherein the step of adding an alloying material comprises the step of melting a portion of said insert and said portion of the inside surface of said tube together.

4. The method of claim 3, wherein said insert comprises a tubular member having a center section and two end sections; and wherein the portion of said insert which is melted is only said center section.

5. The method of claim 3, further comprising the step of expanding said insert to be in essentially full contact with said tube.

6. The method of claim 3, wherein the step of melting further comprises directing laser energy to the interior surface of said tube.

7. The method of claim 1, wherein the step of melting further comprises directing laser energy to the interior surface of said tube.

8. A method for expanding the operating life of a tube having a discontinuity extending at least part way through its wall thickness, comprising the steps of:

melting a portion of said tube in the area of said discontinuity to create a weld pool which comes in contact with said discontinuity and which reforms at least a portion of said discontinuity; adding an alloying material to said weld pool; allowing said weld pool to cool and solidify; analyzing the growth rate of said discontinuity before and after the alloying step; and determining the operating life of the tube based upon a comparison of the discontinuity growth rate.

9. A method for extending the operating life of a tube having a discontinuity extending at least part way through its wall thickness comprising the steps of:

positioning an insert of said alloying material adjacent said inside surface of said tube;

melting a portion of said tube, including melting a portion of said insert and said portion of the inside surface of said tube together, in the area of said discontinuity to create a weld pool which comes in contact with said discontinuity and which reforms at least a portion of said discontinuity;

adding an alloying material to said weld pool;

allowing said weld pool to cool and solidify; and then expanding said insert to be in essentially full contact with said tube after the step of melting.

10. The method of claim 9, wherein the step of expanding comprises subjecting said insert to the normal operating pressure of said tube.

11. A method for the repair of a tube having a discontinuity extending at least part way through its wall thickness, the method comprising the steps of:

removing a vessel having a tube therein from service, the tube having a discontinuity extending at least part way through its wall thickness;

inserting a welding head into said tube while said tube is in said vessel;

operating said welding head to melt at least about 40% of the wall thickness of a portion of said tube in the area of said discontinuity to create a weld pool which comes in contact with said discontinuity and which reforms at least a portion of said discontinuity;

operating a weld wire feeding means to deliver an alloying weld wire into said weld pool, thereby melting said wire and said portion of said tube together;

allowing said weld pool to cool and solidify; and performing a nondestructive examination of said cooled and solidified weld pool.

12. The method of claim 11, wherein said weld wire feeding means is integral with said welding head.

13. The method of claim 11, further comprising the step of performing a post weld stress relief process on said portion of said tube.

14. The method of claim 11, further comprising the steps of: analyzing the structural integrity of said tube; and then determining the acceptability of an extended operating life for said tube as a result of said repair.

15. The method of claim 11, wherein the step of operating said welding head to melt a portion of said tube further comprises directing laser energy through said welding head to the interior surface of said tube.

16. A method for the repair of a tube having a discontinuity extending at least part way through its wall thickness, the method comprising the steps of:

providing a tube comprised of nickel-base Alloy 600;

providing a alloying weld wire comprised of a nickel-base alloy of the group Alloy 690 and AWS Class ERNiCr-3;

inserting a welding head into said tube;

operating said welding head to melt a portion of said tube in the area of said discontinuity to create a weld pool which comes in contact with said discontinuity and which reforms at least a portion of said discontinuity;

operating a weld wire feeding means to deliver an alloying weld wire into said weld pool, thereby melting said wire and said portion of said tube together; and allowing said weld pool to cool and solidify.

17. A method for expanding the operating life of a tube having a discontinuity extending at least part way through its wall thickness, comprising the steps of: melting a portion of a tube comprised of nickel-base Alloy 600 in the area of said discontinuity to create a weld pool which comes in contact with said discontinuity and which reforms at least a portion of said discontinuity; adding an alloying material composed of a nickel-base alloy of the group Alloy 690 and AWS Class ERNiCr-3 to said weld pool; and allowing said weld pool to cool and solidify.

18. A method for expanding the operating life of a tube having a discontinuity extending at least part way through its wall thickness, comprising the steps of: melting a portion of said tube in the area of said discontinuity to create a weld pool which comes in contact with said discontinuity and which reforms at least a portion of said discontinuity; adding a chromium-containing alloying material to said weld pool for raising the chromium concentration of said tube portion in said area contacting said discontinuity; and allowing said weld pool to cool and solidify.

19. The method of claim 18, wherein the step of adding an alloying material comprises adding a chromium-containing alloy material to a weld pool of an Alloy 600 tube for raising the chromium concentration of said weld pool in said area contacting said discontinuity to a chromium concentration of nickel-base Alloy 690.

20. The method of claim 18, wherein the melting step comprises melting at least about 40% of the wall thickness of the tube.

* * * * *